(12) United States Patent
Stern et al.

(10) Patent No.: US 7,446,822 B2
(45) Date of Patent: Nov. 4, 2008

(54) HIGH-RESOLUTION IMAGE PROJECTION

(75) Inventors: Miklos Stern, Woodmere, NY (US);
Dmitriy Yavid, Stony Brook, NY (US);
Chinh Tan, Setauket, NY (US);
Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 634 days.

(21) Appl. No.: 10/427,528

(22) Filed: May 1, 2003

(65) Prior Publication Data

US 2004/0017518 A1 Jan. 29, 2004

Related U.S. Application Data

(60) Provisional application No. 60/380,806, filed on May 15, 2002.

(51) Int. Cl.
*H04N 9/28* (2006.01)
*H04N 9/31* (2006.01)
(52) U.S. Cl. .................. 348/747; 348/744; 348/756; 348/792; 348/825; 359/201
(58) Field of Classification Search ................ 348/789, 348/747, 794, 792, 787, 744, 756, 781, 825, 348/832, 836; 353/119, 74; 359/213, 214, 359/850, 201; 235/454
See application file for complete search history.

(56) References Cited

U.S. PATENT DOCUMENTS

| | | | | |
|---|---|---|---|---|
| 4,979,030 A | * | 12/1990 | Murata | 348/196 |
| 5,032,924 A | * | 7/1991 | Brown et al. | 348/759 |
| 5,311,321 A | * | 5/1994 | Crowley | 348/760 |
| 5,673,139 A | | 9/1997 | Johnson | |
| 5,742,358 A | | 4/1998 | Iijima et al. | |
| 5,822,022 A | | 10/1998 | Deter et al. | |
| 5,864,418 A | | 1/1999 | Allen et al. | |
| 6,018,408 A | * | 1/2000 | Hong | 359/201 |
| 6,122,023 A | * | 9/2000 | Chen et al. | 349/86 |
| 6,371,616 B1 | | 4/2002 | Doany et al. | |
| 6,390,627 B1 | | 5/2002 | Kuroda | |
| 6,491,395 B2 | | 12/2002 | Shirakura et al. | |
| 6,832,724 B2 | * | 12/2004 | Yavid et al. | 235/454 |

FOREIGN PATENT DOCUMENTS

EP 1 168 231 A2 1/2002

* cited by examiner

*Primary Examiner*—David Ometz
*Assistant Examiner*—Jean W Désir
(74) *Attorney, Agent, or Firm*—Kirschtein, et al.

(57) ABSTRACT

A lightweight, compact image projection module, especially for mounting in a housing having a light-transmissive window, is operative for causing selected pixels in a raster pattern to be illuminated to produce an image of high resolution of VGA quality in monochrome, color or gray scale. Pixel size is controlled as a function of distance of the image from the module to control image resolution and allow the image to remain sharp and clear over an extended range of distances from the module.

15 Claims, 5 Drawing Sheets

HIGH-RESOLUTION IMAGE PROJECTION

CROSS REFERENCE TO RELATED APPLICATION

This application claims priority to U.S. Provisional Patent Application Ser. No. 60/380,806, filed May 15, 2002.

BACKGROUND OF THE INVENTION

1. Field of the Invention

The present invention generally relates to projecting a two-dimensional image in monochrome, gray scale or color and, more particularly, to controlling image resolution over an extended range of projected distances of the image, while maintaining low power consumption, high resolution, miniature compact size, quiet operation and minimal vibration.

2. Description of the Related Art

It is generally known to project a two-dimensional image on a screen based on a pair of scan mirrors which oscillate in mutually orthogonal directions to scan a laser beam over a raster pattern. However, the known image projection systems have limited resolution, typically less than a fourth of video-graphics-array (VGA) quality of 640×480 pixels. Also, the image produced by the known projection systems is typically only sharp and clear at a single distance, or at most, a limited range of distances, away from the systems. The physical size and power consumption of the known projection systems are relatively high, thereby rendering them impractical for use in miniature, hand-held, battery-operated applications. Also, the low scan rates of the scan mirrors generate objectionable noise and vibration during use.

SUMMARY OF THE INVENTION

Objects of the Invention

Accordingly, it is a general object of this invention to provide an image projection system that projects a sharp and clear, two-dimensional image over an extended range of distances away from the system.

Another object of this invention is to minimize power consumption in such projection systems.

Still another object of this invention is to increase the resolution of the image projected by such systems.

Yet another object of this invention is to reduce, if not eliminate, objectionable noise and vibration during operation.

An additional object is to provide a miniature, compact, lightweight, and portable image projector useful in many instruments of different form factors.

Features of the Invention

In keeping with these objects and others which will become apparent hereinafter, one feature of this invention resides, briefly stated, in an image projection module for projecting a two-dimensional image. The module includes a support, for example, a printed circuit board; a laser, for example, a solid-state laser, for emitting a laser beam; a scanner for sweeping a pattern of scan lines in space at a variable distance from the module, each scan line having a number of pixels; and a controller for causing selected pixels to be illuminated, and rendered visible, by the laser beam to produce the image.

In accordance with one aspect of this invention, optics are provided on the support, for controlling pixel size as a function of the variable distance of the image from the module to control resolution of the image over an extended range of distances from the module. The optics include a lens assembly for maintaining the image resolution substantially constant over the extended range.

In the preferred embodiment, the scanner includes a pair of oscillatable scan mirrors for sweeping the laser beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The image resolution preferably exceeds one-fourth of VGA quality, but typically equals or exceeds VGA quality. The support, laser, scanner, controller and optics preferably occupy a volume of less than five cubic centimeters, and typically less than 3½ cubic centimeters.

Another feature of this invention resides in rendering the image in monochrome, color or gray scale. Preferably, the controller energizes the laser to illuminate the selected pixels with the same intensity, and deenergizes the laser to non-illuminate the other non-selected pixels. By modulating a drive current conducted to the laser and/or by modulating a time interval during which the laser beam dwells on a selected pixel, the intensity of the image is varied as desired. By energizing selected laser beams of different wavelengths, a color image is produced.

The scan module is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
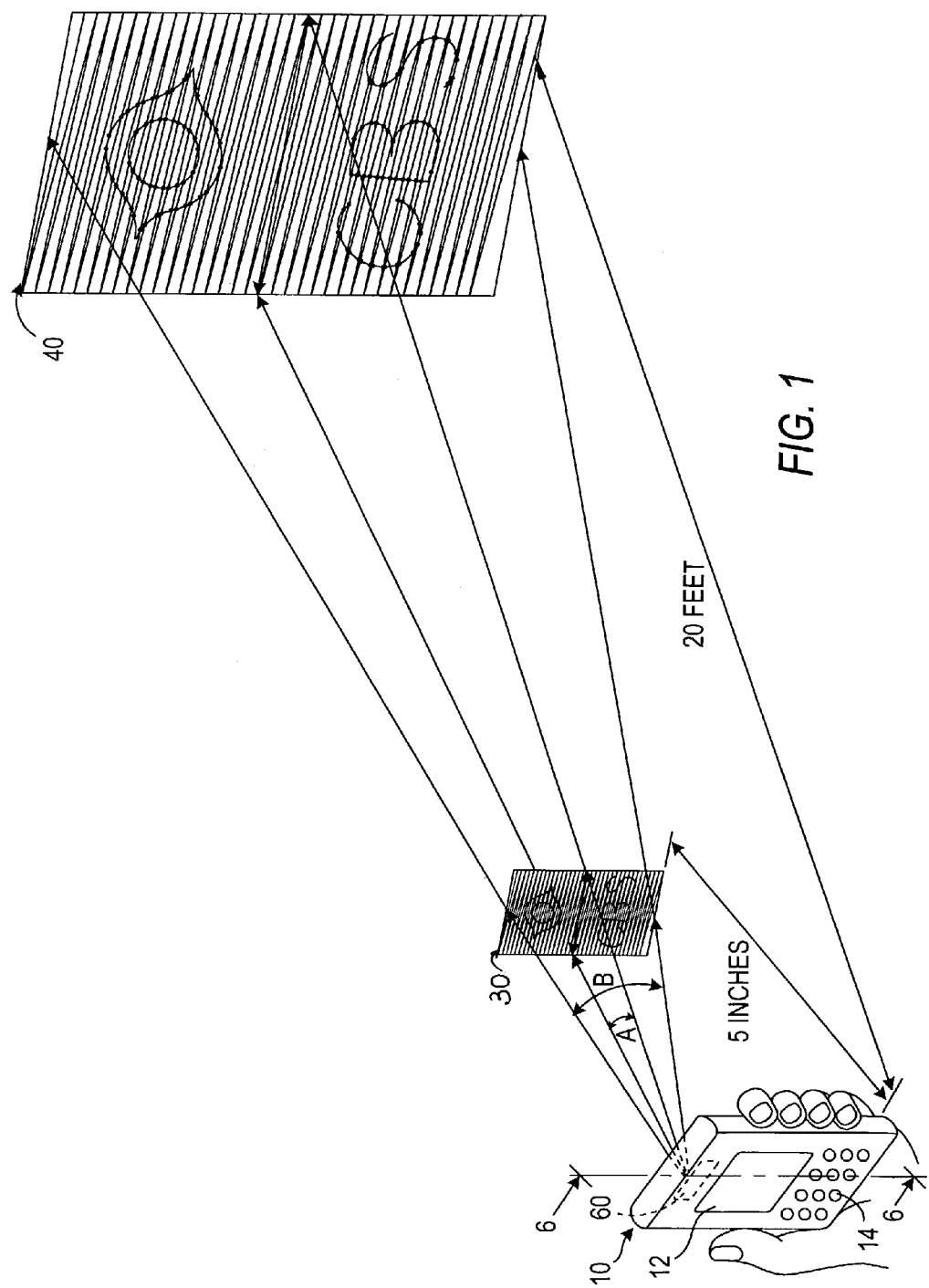
FIG. 1 is a perspective view of a hand-held instrument projecting an image at a substantially constant resolution over an extended range of distances therefrom.
Figure 2:
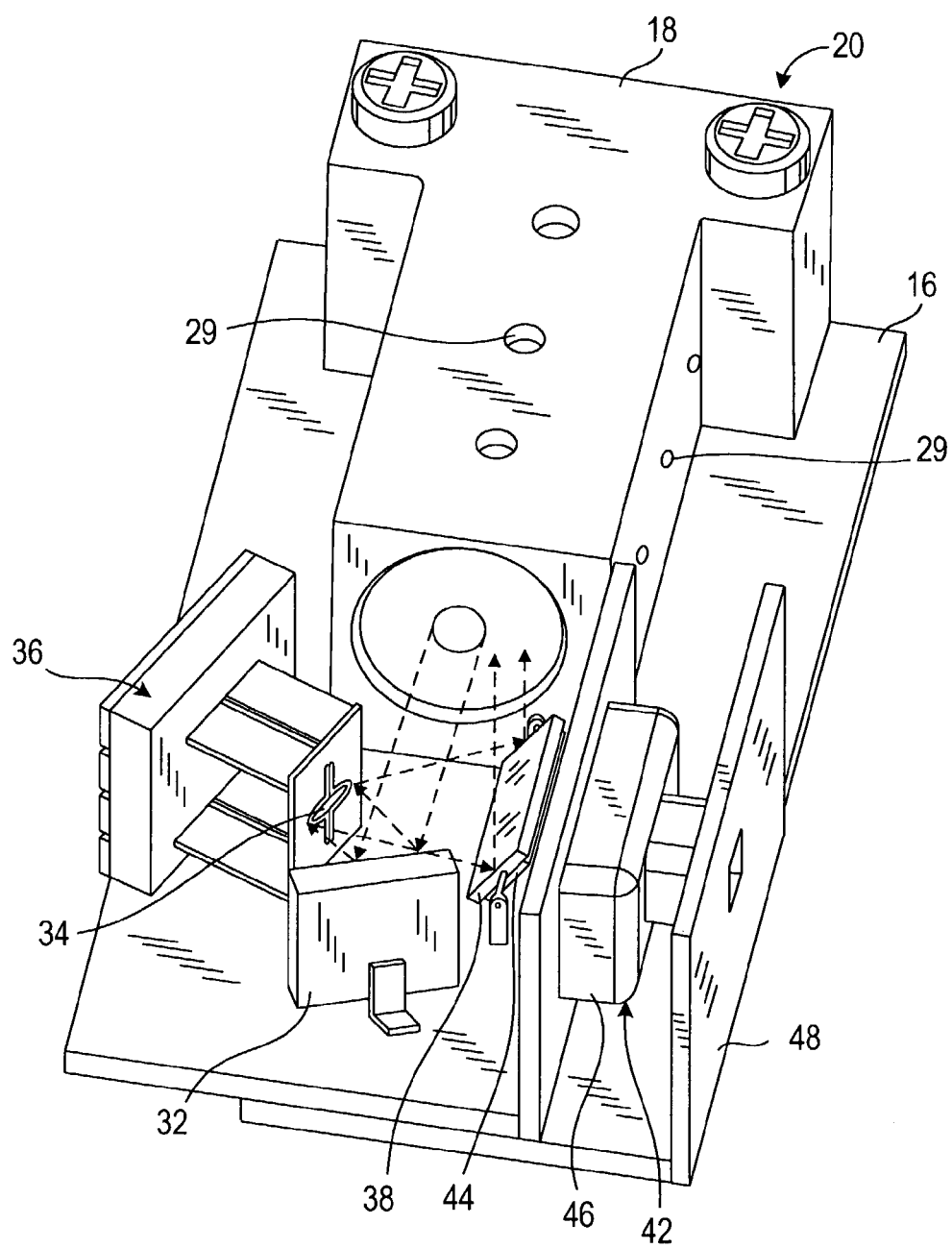
FIG. 2 is an enlarged, overhead, perspective view of an image projection module in accordance with this invention for installation in the instrument of FIG. 1.

Reference numeral 10 in FIG. 1 generally identifies a hand-held instrument, for example, a personal digital assistant, in which a lightweight, compact, image projection module 20, as shown in FIG. 2, is mounted and operative for projecting a two-dimensional image at a variable distance from the module. By way of example, a close-in image 30 is situated relatively close to the instrument, for example, a few inches away (near-zero); and a far-away image 40 is situated relatively far from the instrument, for example, more than twenty feet away (near-infinity). As described herein, no matter whether the projected image is near-zero, near-infinity, or at any distance therebetween, the resolution of the image is controlled to be approximately constant so that the image is sharp and clear and focused anywhere in this extended range of distances.

As shown in FIG. 1, both images 30, 40 have the same optical horizontal scan angle A extending along the horizontal direction, and the same optical vertical scan angle B extending along the vertical direction, of the respective image. As described below, each image is comprised of illuminated and non-illuminated pixels on a raster pattern of scan lines swept by a scanner in the module 20.

The parallelepiped shape of the instrument 10 represents just one form factor of a housing in which the module 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the module 20 measures about 30 mm×15 mm×10 mm or about 4.5 cubic centimeters. This compact, miniature size allows the module 20 to be mounted in housings of many diverse shapes, large or small, portable or stationary, including some having an on-board display 12 and a keypad 14.

Referring to FIG. 2, the module 20 includes a support 16, for example, a printed circuit board, and a laser/optics casing 18 in which are mounted a laser 25 (see FIG. 5) and a lens assembly, including one or more lenses and preferably a pair of lenses 22, 24 operative for optically modifying a laser beam emitted by the laser 20.

Figure 5:
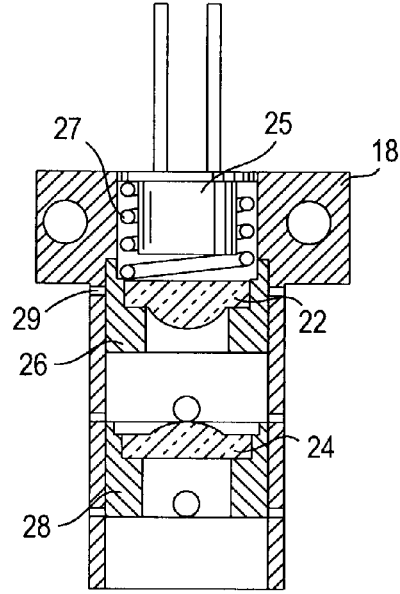
FIG. 5 is an enlarged sectional view of the laser/optics assembly of the module as taken on line 5-5 of FIG. 3.
Figure 4:
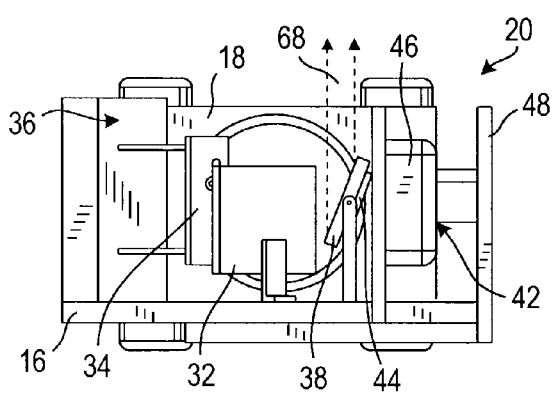
FIG. 4 is an end elevational view of the module of FIG. 3.

As best seen in FIG. 5, the laser 25 is a solid-state laser, preferably, a semiconductor laser, which, when energized, emits a bright red laser beam at 635-655 nanometers having an oval cross-section. Lens 22 is a biaspheric convex lens having a positive focal length of about 2 mm and is operative for collecting virtually all the energy in the beam and for producing a diffraction-limited beam. Lens 24 is a concave lens having a negative focal length of about −20 mm. Lenses, 22, 24 are held by respective lens holders 26, 28 about 4 mm apart inside the casing 18 and are fixed in place by allowing an adhesive (not illustrated for clarity) introduced during assembly into the fill holes 29 to set. A coil spring 27 assists in positioning the laser. The lenses 22, 24 shape the beam profile, as explained below, over the extended range.

The laser beam exiting the casing 18 is directed to, and reflected off, an optional stationary bounce mirror 32. A scanner is also mounted on the board 16 and includes a first scan mirror 34 oscillatable by an inertial drive 36 at a first scan rate to sweep the laser beam reflected off the bounce mirror over the first horizontal scan angle A, and a second scan mirror 38 oscillatable by an electromagnetic drive 42 at a second scan rate to sweep the laser beam reflected off the first scan mirror 34 over the second vertical scan angle B. In a variant construction, the scan mirrors 34, 38 can be replaced by a single two-axis mirror.

The inertial drive 36 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the module to less than one watt and, in the case of projecting a color image, as described below, to less than ten watts.

The electromagnetic drive 42 includes a permanent magnet 44 jointly mounted on and behind the second scan mirror 38, and an electromagnetic coil 46 operative for generating a periodic magnetic field in response to receiving a periodic drive signal. The coil 46 is adjacent the magnet 44 so that the periodic field magnetically interacts with the permanent field of the magnet 44 and causes the magnet and, in turn, the second scan mirror 38 to oscillate. The coil 46 is supported by an upright wall 48 connected to the board 16.

The inertial drive 36 oscillates the scan mirror 34 at a high speed at a scan rate preferably greater than 5 kHz and, more particularly, on the order of 18 kHz or more. This high scan rate is at an inaudible frequency, thereby minimizing noise and vibration. The electromagnetic drive 42 oscillates the scan mirror 38 at a slower scan rate on the order of 40 Hz which is fast enough to allow the image to persist on a human eye retina without excessive flicker.

The faster mirror 34 sweeps a horizontal scan line, and the slower mirror 38 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

The roles of the mirrors 34, 38 could be reversed so that mirror 38 is the faster, and mirror 34 is the slower. Mirror 34 can also be designed to sweep the vertical scan line, in which event, mirror 38 would sweep the horizontal scan line. Also, the inertial drive can be used to drive the mirror 38. Indeed, either mirror can be driven by an electromechanical, electrical, mechanical, electrostatic, magnetic, or electromagnetic drive.

The image is constructed by selective illumination of the pixels in one or more of the scan lines. As described below in greater detail with reference to FIG. 7, a controller causes selected pixels in the raster pattern to be illuminated, and rendered visible, by the laser beam. For example, a power controller 50 conducts an electrical current to the laser 25 to energize the latter to emit light at each selected pixel, and does not conduct an electrical current to the laser 25 to deenergize the latter to non-illuminate the other non-selected pixels. The resulting pattern of illuminated and non-illuminated pixels comprise the image, which can be any display of human- or machine-readable information or graphic. Instead of a power controller, an acousto-optical modulator could be used to deflect the laser beam away from any desired pixel to non-illuminate the pixel by not allowing the laser beam to reach the first scan mirror.

Figure 6:
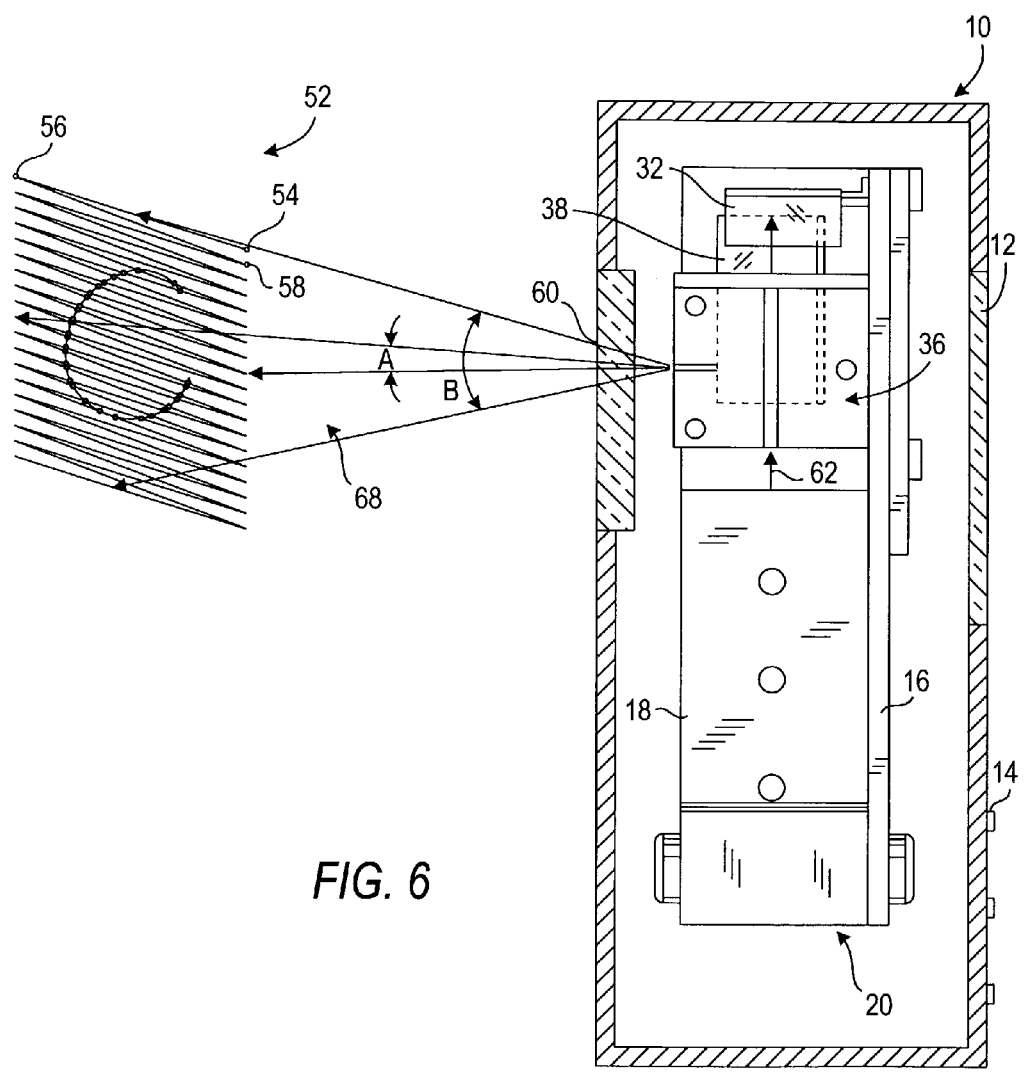
FIG. 6 is an enlarged sectional view taken on line 6-6 of FIG. 1.

Referring to FIG. 6, the raster pattern 52 is shown in an enlarged view. Starting at point 54, the laser beam is swept by the inertial drive along the horizontal direction at the horizontal scan rate to the point 56 to form a scan line. Thereupon, the laser beam is swept by the electromagnetic drive along the vertical direction at the vertical scan rate to the point 58 to form a second scan line. The formation of successive scan lines proceeds in the same manner.

The image is created in the raster pattern by energizing or pulsing the laser on and off at selected times under control of a microprocessor or control circuit by operation of the power controller 50, or by maintaining the laser on and deflecting the laser beam at selected times by operation of an acousto-optical modulator. The laser produces visible light and is turned on, or its beam is properly deflected, only when a pixel in the desired image is desired to be seen. For example, the letter "C" in FIG. 6 is formed by illuminating the pixels at staggered locations on successive lines. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 3:
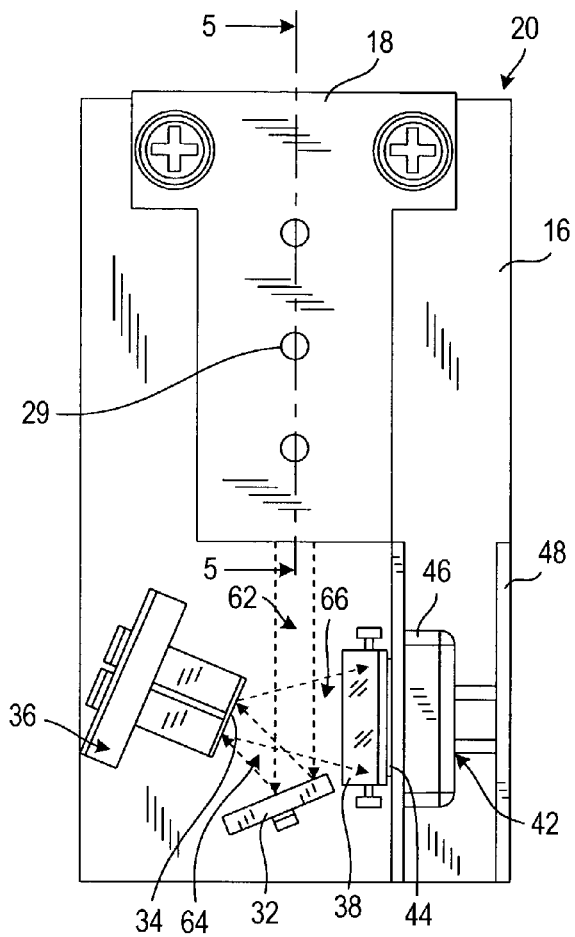
FIG. 3 is a top plan view of the module of FIG. 2.

FIG. 6 also shows a light-transmissive port or window 60 on the instrument 10 and through which the image is projected in a direction generally perpendicular to the printed circuit board 16. Again, with reference to FIG. 3, the optical path of the laser beam has a vertical leg 62 between the laser/optics casing 18 and the bounce mirror 32, an inclined leg 64 toward the left to the scan mirror 34, a horizontal leg 66 toward the right to the scan mirror 38, and a forward leg 68 (see FIG. 6) in a direction toward the viewer and perpendicular to the board 16. The image can be projected on any translucent or reflective surface.

Figure 7:
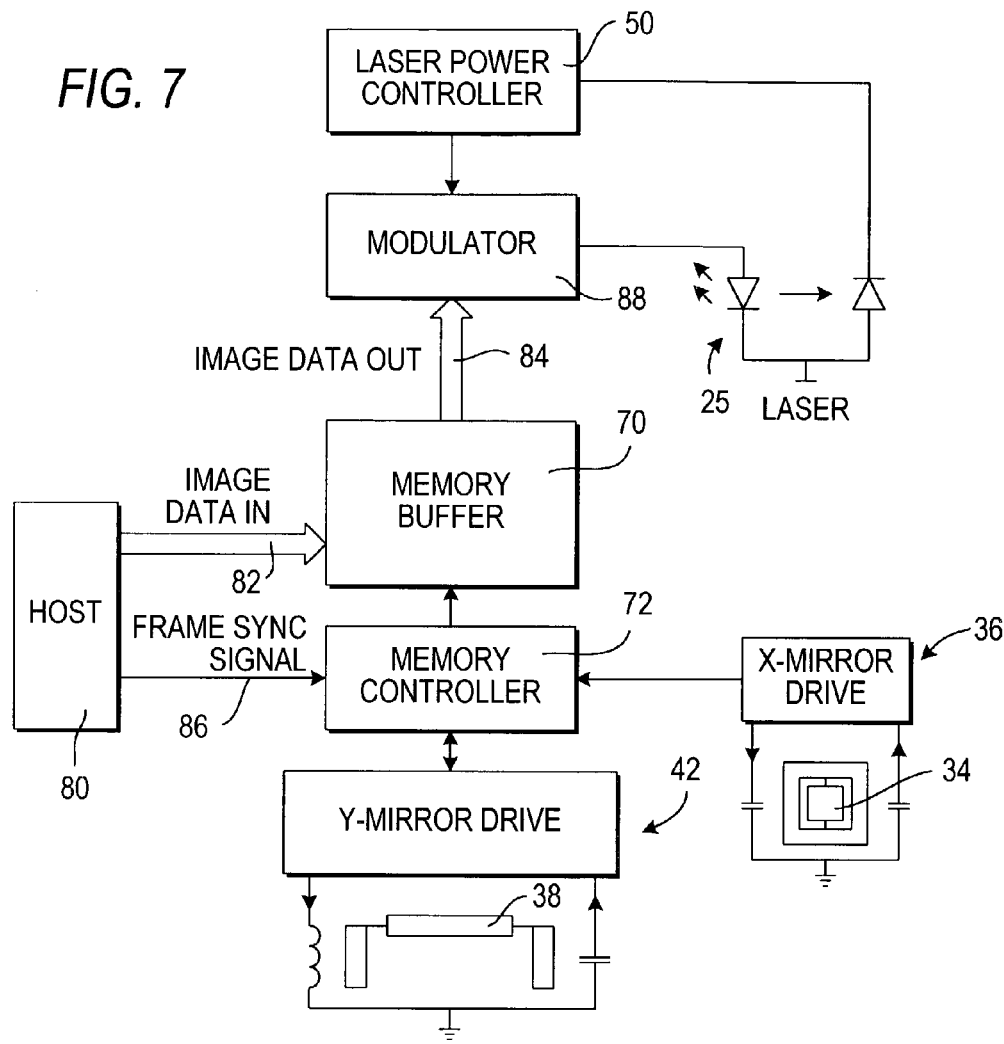
FIG. 7 is an electrical schematic block diagram depicting operation of the module of FIG. 2.

As shown in FIG. 7, a host 80 sends the bit-mapped image data 82 to a memory buffer 70 which is controlled by a memory controller 72. The storage of one full VGA frame would require about 300 kilobytes, and it would be desirable to have enough memory in the buffer 70 for two full frames (600 kilobytes) to enable one frame to be written by the host, while another frame is being read and projected. On the other hand, if the size of the buffer is smaller than a full frame, then the controller 72 can begin displaying lines after the memory has reached its maximum storage capacity with data sent by the host, or there can be simultaneous reading from and writing to the buffer. A frame synchronization signal 86 is sent by the host to the controller 72.

The first scan mirror 34, also known as the high speed or X-axis mirror, is driven by the inertial drive 36 and is controlled by the memory controller 72. Similarly, the second scan mirror 38, also known as the slow speed or Y-axis mirror, is driven by the electromagnetic drive 42 and is controlled by the memory controller 72. Since the image is projected during both forward and backward scans of the X-axis mirror, every other line of image data is displayed in reverse order. Hence, either the host has to write the image data to the buffer in the reverse order, or the memory controller has to read the image data in the reverse order.

The X-axis mirror has a sinusoidal velocity profile. In a given time interval, the laser beam sweeps more pixels in the middle of each scan line than at the ends of each scan line. To avoid image distortion, either the memory controller 72 should clock the pixels at a variable clock rate, or the host should fill the buffer 70 with data in which the size of the pixels is varied. A variable clock rate is the preferred technique since it allows pixels of a fixed size to be shared with other displays.

The output of the buffer is a digital signal 84 which is frame-synchronized with the host, and clock-and line-synchronized with the X-axis mirror 34. This digital signal is sent to a modulator 88 which, in turn, controls the laser 25.

As previously mentioned, the optical assembly operates to maintain the image resolution constant over an extended range. Specifically, the lenses 22, 24 focus the image 30 to be in focus at a near-zero distance, for example, five inches in FIG. 1. As the distance from image 30 to the projected image 40 increases, the size of each pixel is linearly and proportionately increased, and vice versa. Hence, the optical assembly has shaped the beam profile so that the ratio of the distance to the spot size is maintained substantially constant for a given scan angle. In the preferred embodiment, the horizontal scan angle is ±15° optical and the vertical scan angle is ±20° optical (for a VGA display).

The image from a single laser may either be monochrome in which all the illuminated pixels have the same intensity, or may be rendered in gray scale in which the illuminated pixels have a variable intensity. To vary the intensity, the modulator 88 can either vary the time that each pixel is illuminated, or can vary the amount of drive current that is applied to the laser for each pixel.

Figure 8:
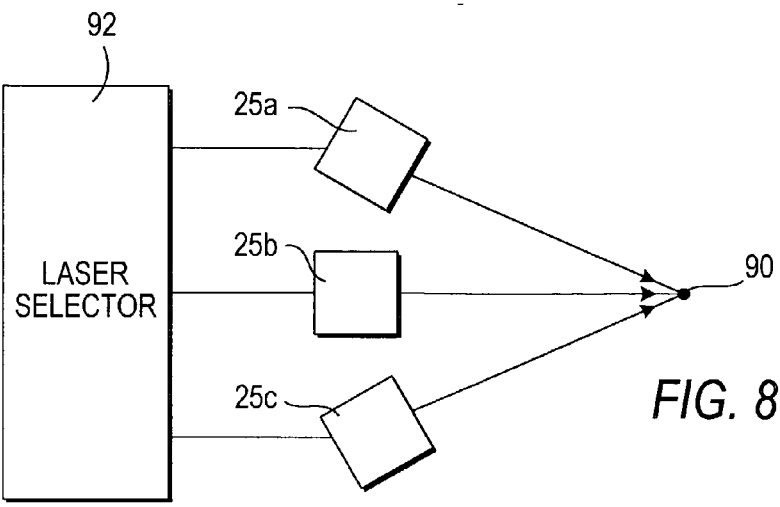
FIG. 8 is a diagrammatic view of a detail of a variant construction.

The image can also be rendered in color by using a plurality of lasers 25a, 25b, 25c (see FIG. 8) of different frequencies, or by interposing crystals in the path of a single laser. Red, green and blue lasers can produce respective red, green and blue spots of light which are all directed to the same spot 90 on the bounce mirror 32. If only one laser is energized, then the spot on the mirror 32 will have the color of the energized laser. If two or more lasers are energized, then the spot on the mirror will have the mixed color of all the energized lasers. Any color in the visible light spectrum can be formed by the selective superimposition of one or more of the red, green and blue lasers. The selection of the lasers is performed by a laser selector unit 92. For a color image, the size of the module increases, but is still compact by being less than 30 cubic centimeters in volume.

It will be understood that each of the elements described above, or two or more together, also may find a useful application in other types of constructions differing from the types described above.

While the invention has been illustrated and described as embodied in a high-resolution image projection module and arrangement, it is not intended to be limited to the details shown, since various modifications and structural changes may be made without departing in any way from the spirit of the present invention.

For example, the lenses 22, 24 need not be stationary as described above to control the image resolution, but at least one of the lenses could be movable so that the distance to the image 30 is adjustable. A rangefinder can be employed to measure the distance to the image 30, and then the measured distance is used to vary the extent that the movable lens is moved.

Still another useful application for this invention resides in achieving full motion video as is conventionally viewable on television screens. According to this invention, the image can be redrawn at the refresh rate, that is, at least 30 to 40 times per second. A succession of such redrawn images displays a movie. Hence, this invention is not to be limited to the display of a single static image, but is expressly intended to cover a motion picture consisting of the dynamic display of multiple images.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image projection module for projecting a two-dimensional image, comprising:
   a) a support,
   b) a laser on the support, for emitting a laser beam;

c) a scanner on the support, for sweeping a pattern of scan lines in space at a variable distance from the module, each scan line having a number of pixels;
d) a controller operatively connected to the laser and the scanner, for causing selected pixels to be illuminated, and rendered visible, by the laser beam to produce the image; and
e) optics on the support, for controlling pixel size as a function of the variable distance of the image from the module to control resolution of the image over an extended range of distances from the module.

2. The image projection module of claim 1, wherein the support is a printed circuit board.

3. The image projection module of claim 1, wherein the laser is a solid-state laser.

4. The image projection module of claim 1, wherein the scanner includes a first oscillatable scan mirror for sweeping the laser beam along a first direction at a first scan rate and over a first scan angle, and a second oscillatable scan mirror for sweeping the laser beam along a second direction substantially perpendicular to the first direction, and at a second scan rate different from the first scan rate, and at a second scan angle different from the first scan angle.

5. The image projection module of claim 4, wherein at least one of the scan rates exceeds audible frequencies to minimize noise.

6. The image projection module of claim 4, wherein at least one of the scan mirrors is oscillated by an inertial drive.

7. The image projection module of claim 1, wherein the controller includes means for energizing the laser to illuminate the selected pixels, and for deenergizing the laser to non-illuminate pixels other than the selected pixels.

8. The image projection module of claim 1, wherein the controller includes means for modulating the laser beam to illuminate the selected pixels with a variable intensity to produce the image with a gray scale.

9. The image projection module of claim 4, wherein the optics includes a lens assembly for maintaining the image resolution substantially constant for each scan angle.

10. The image projection module of claim 9, wherein the image resolution comprises at least 160 pixels in each scan line, and at least 160 scan lines.

11. The image projection module of claim 1, wherein the support, laser, scanner, controller, and optics together occupy a volume of less than five cubic centimeters.

12. The image projection module of claim 6, wherein the inertial drive reduces power consumption to less than one watt.

13. A power-minimizing image projection module for projecting a two-dimensional image, comprising:
a) a support;
b) a laser on the support, for emitting a laser beam;
c) optics on the support, for focusing the laser beam to a beam spot at a distance from the module;
d) a scanner including a pair of oscillatable scan mirrors on the support, for sweeping the beam spot at respective scan rates in a pattern of scan lines in space at said distance from the module, each scan line having a number of pixels, at least one of the mirrors being driven by an inertial drive to minimize power consumption to less than one watt; and
e) a controller operatively connected to the laser and the scanner, for causing selected pixels to be illuminated, and rendered visible, by the laser beam to produce the image.

14. An image projection arrangement for projecting a two-dimensional image, comprising:
A) a housing having a light-transmissive port; and
B) a module mounted in the housing, the module including
a) a support;
b) a laser on the support, for emitting a laser beam through the port;
c) a scanner on the support, for sweeping a pattern of scan lines in space at a variable distance from the port, each scan line having a number of pixels;
d) a controller operatively connected to the laser and the scanner, for causing selected pixels to be illuminated, and rendered visible, by the laser beam to produce the image; and
e) optics on the support, for controlling pixel size as a function of the variable distance of the image from the port to control resolution of the image over an extended range of distances from the port.

15. A method of projecting a two-dimensional image at a variable distance, comprising the steps of:
a) emitting a laser beam;
b) sweeping a pattern of scan lines in space, each scan line having a number of pixels;
c) causing selected pixels to be illuminated, and rendered visible, by the laser beam to produce the image; and
d) controlling pixel size as a function of the variable distance of the image to control resolution of the image over an extended range of distances.

* * * * *